C. A. HIRTH.
ROLLER BEARING CAGE.
APPLICATION FILED APR. 30, 1912.
1,173,719. Patented Feb. 29, 1916.
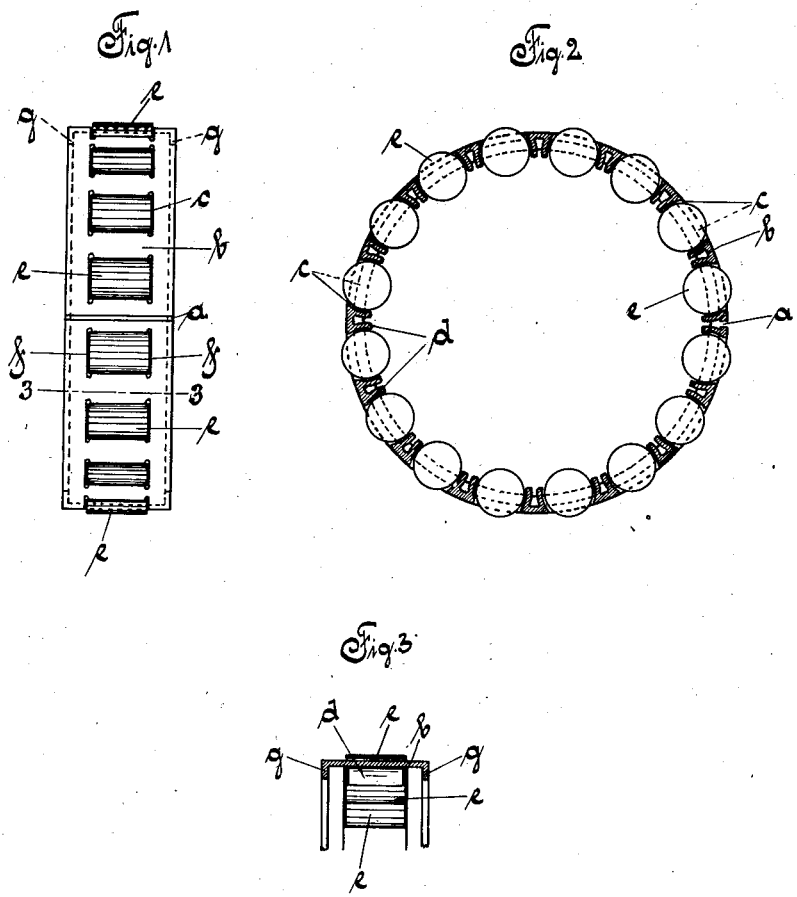

UNITED STATES PATENT OFFICE.

CARL ALBERT HIRTH, OF CANNSTATT, NEAR STUTTGART, GERMANY, ASSIGNOR TO NORMA COMPAGNIE G. M. B. H., OF CANNSTATT-STUTTGART, GERMANY.

ROLLER-BEARING CAGE.

1,173,719.

Specification of Letters Patent. Patented Feb. 29, 1916.

Application filed April 30, 1912. Serial No. 694,043.

*To all whom it may concern:*

Be it known that I, CARL ALBERT HIRTH, a citizen of the German Empire, residing in Cannstatt, near Stuttgart, in said Empire of Germany, have invented certain new and useful Improvements in Roller-Bearing Cages, of which the following is a specification.

This invention relates to an improved roller-bearing cage in which the rollers are held in pockets or pairs of cheeks which are punched by means of dies from a ring-shaped blank and then bent into shape for retaining the rollers.

The improved cage is differentiated from cages heretofore in use in that the cheeks which retain the rollers project toward the inside of the ring shaped body and are so formed that they permit by their spring-action the insertion and removal of the rollers, but embrace the rollers loosely when inserted in such a manner that they cannot drop out of themselves but form with the cage a complete and conveniently handled structure.

This new form of roller-bearing cage is of considerable importance, as it can be easily manufactured and placed with great facility on the shaft on which they have to be mounted. For this purpose the cage is so made that it is not closed entirely like a solid ring but open at one point so that the cage can be bent outwardly sufficiently to bring it over the shaft, so that the shaft is located in its open portion, and that the ring springs afterward into closed position. The fact that the roller retaining cheeks project toward the inside of the ring facilitate the introduction of the rollers into the cage-ring when spread into open position and secures the rollers in their proper position when it has sprung back into its closed position. The cage is furthermore contra-distinguished from other forms of cages in which the retaining cheeks project in outward direction and which even if they prevent the dropping of the rollers from the retaining cheeks by the spreading apart of the ring require a sufficient space between the retainers so that the rollers in the closed position of the ring cannot drop from the same, or that they would be bent out of shape by the first spreading apart of the cage and rollers in such a manner that they would, when the ring is closed, not be able to retain the rollers.

One form of the improved roller-bearing cage is shown in the accompanying drawings, in which—

Figure 1 represents a side-elevation, Fig. 2 a vertical longitudinal section on line 2—2, Fig. 1, and Fig. 3 a vertical transverse section on line 3—3, Fig. 1.

Similar letters of reference indicate corresponding parts throughout the several figures of the drawings.

The cage consists essentially of a flat ring $b$ which can be spread outwardly into an open position at one point of its circumference, namely at $a$ and which is provided with rectangular openings $c$ in its circumference, the transverse edges of which are bent inwardly so as to form cheeks $d$ which are slightly curved toward the interior of the ring so as to secure the rollers $e$ against dropping out of the cage without offering any resistance to the motion of the same when they are in use. The cheeks $d$ extend only to such an extent around the rollers as to just prevent them from dropping out of the same even when the ring is spread apart sufficiently at its opening $a$ that it can be passed over the shaft on which the cage is to be placed. Against the axial shifting of the ring, the rollers are held by the side-rims $f$ of the rectangular openings.

The ring $b$ is made of feathering sheet metal so that it will return into its initial position after being spread apart. It is advisable, however, to increase its stiffness by means of bent-over flanges $g$ at its circumference, which flanges may project toward the inside or toward the outside of the ring, as desired.

The manufacture of the cage is best accomplished in such a manner that first a band-shaped strip of a suitable ductile and elastic metal is cut out by means of dies with openings of rectangular shape whose walls are bent up toward each other and slightly curved. A strip corresponding in length to the circumference of the shaft on which the roller-bearing is to be used is then cut off and bent into an open ring with abutting ends. The circumferential flanges *g* are bent up simultaneously with the bending of the strip into circular shape.

I claim:

1. A roller-bearing cage, comprising a one-piece spring-like body formed into a ring with its ends normally abutting, and holders bent up inwardly from incisioned portions in the body so as to form spring-like cheeks bent inwardly into shape conforming to the contour of the rollers, the spring-like cheeks engaging the rollers at a peripheral part thereof at the outer side of their axes, and extending inwardly from that point of engagement along the peripheral portion of the rollers to a point on the peripheral portion, at the inner side of their axes, and in proximity to the axes thereof, for embracing the same sufficiently to prevent the rollers from dropping out in inward or outward direction during the spreading of the spring-like body from normal position and its return thereto.

2. A roller-bearing cage, consisting of a one-piece spring-like body formed into a ring with the ends normally abutting, and holders bent up from the ring-shaped body inwardly from incisioned portions in the body, so as to form spring-like cheeks, for retaining the rollers and curved to the shape of the rollers therebetween for embracing the same sufficiently to prevent the rollers from dropping out during the spreading of the spring-like body from normal position and its return thereto, the spring-like cheeks engaging the rollers at their peripheral portion outside of their axes and extending inwardly from that portion to a point at the inside of their axes, and the spring-like body having rectangular openings for a portion of the rollers to pass therethrough.

3. A roller-bearing cage, comprising a one-piece spring-like body formed into a ring with the ends normally abutting, having holders bent up inwardly from incisioned portions in the body so as to form spring-like cheeks bent into shape for retaining the rollers and curved to the shape of the rollers retained therebetween for embracing the same sufficiently to prevent the rollers from dropping out during the spreading of the spring-like body from normal position and its return thereto, the spring-like cheeks engaging the rollers at their peripheral portion outside of their axes, and extending inwardly from that portion to a point at the inside of their axes, and flanges along the ends of the ring-shaped body.

In testimony, that I claim the foregoing as my invention, I have signed my name in presence of two subscribing witnesses.

CARL ALBERT HIRTH.

Witnesses:
PAULINE KLAIBER,
FRIDA KLAIBER.